United States Patent
Skillermark et al.

(10) Patent No.: US 11,750,411 B2
(45) Date of Patent: *Sep. 5, 2023

(54) METHOD OF AND DEVICES FOR SUPPORTING SELECTIVE FORWARDING OF MESSAGES IN A NETWORK OF COMMUNICATIVELY COUPLED COMMUNICATION DEVICES

(71) Applicant: Telefonaktiebolaget LM Ericsson (publ), Stockholm (SE)

(72) Inventors: Per Skillermark, Årsta (SE); Per Elmdahl, Linköping (SE); Thomas Rimhagen, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/079,268

(22) Filed: Dec. 12, 2022

(65) Prior Publication Data

US 2023/0106171 A1    Apr. 6, 2023

Related U.S. Application Data

(63) Continuation of application No. 17/218,730, filed on Mar. 31, 2021, now Pat. No. 11,552,815, which is a
(Continued)

(51) Int. Cl.
*H04L 12/18* (2006.01)
*H04L 12/46* (2006.01)
(Continued)

(52) U.S. Cl.
CPC ........ *H04L 12/185* (2013.01); *H04L 12/4633* (2013.01); *H04L 12/4641* (2013.01);
(Continued)

(58) Field of Classification Search
CPC .............. H04L 12/185; H04L 12/4633; H04L 12/4641; H04L 12/66; H04L 45/16; H04L 61/2514; H04L 61/5069
See application file for complete search history.

(56) References Cited

U.S. PATENT DOCUMENTS 6,070,187 A   5/2000  Subramaniam et al.
6,259,701 B1  7/2001  Shur et al.
(Continued)

FOREIGN PATENT DOCUMENTS

CN    1894900 A     1/2007
CN    101473616 A   7/2009
(Continued)

OTHER PUBLICATIONS

Heydon, Robin, et al., "Mesh Model", Bluetooth Specification; v1.0; Mesh Working Group, Jul. 13, 2017, pp. 1-314.
(Continued)

*Primary Examiner* — Vinncelas Louis
(74) *Attorney, Agent, or Firm* — Murphy, Bilak & Homiller, PLLC

(57) ABSTRACT

Embodiments include methods for a gateway device to selectively forward messages in a wireless mesh network. Such methods include receiving, over one of a plurality of network interfaces of the gateway device, a message published to a group address or a virtual address and retrieving, from a database accessible by the gateway device, unicast addresses of all communication devices identified by the group address or the virtual address. Such methods include, based on determining that all communication devices addressed by the retrieved unicast addresses are serviced by the gateway device, sending the received message on all network interfaces that correspond to the communication devices addressed by the retrieved unicast addresses; and based on determining that not all communication devices
(Continued)

addressed by the retrieved unicast addresses are serviced by the gateway device, sending the received message on all network interfaces except for the network interface over which the message was received.

18 Claims, 4 Drawing Sheets

Related U.S. Application Data continuation of application No. 16/092,072, filed as application No. PCT/EP2018/074684 on Sep. 13, 2018, now Pat. No. 11,012,250.

(51) Int. Cl.
*H04L 12/66* (2006.01)
*H04L 45/16* (2022.01)
*H04L 61/2514* (2022.01)
*H04L 61/5069* (2022.01)

(52) U.S. Cl.
CPC .............. *H04L 12/66* (2013.01); *H04L 45/16* (2013.01); *H04L 61/2514* (2013.01); *H04L 61/5069* (2022.05)

(56) References Cited

U.S. PATENT DOCUMENTS

| | | | |
|---|---|---|---|
| 7,373,660 | B1 | 5/2008 | Guichard et al. |
| 10,382,284 | B1 | 8/2019 | Slupik et al. |
| 2005/0220096 | A1 | 10/2005 | Friskney et al. |
| 2008/0232368 | A1 | 9/2008 | Ikegami et al. |
| 2010/0329265 | A1 | 12/2010 | Lapuh et al. |
| 2011/0096712 | A1 | 4/2011 | Kish et al. |
| 2011/0103283 | A1 | 5/2011 | Kale et al. |
| 2011/0103284 | A1 | 5/2011 | Gundavelli et al. |
| 2014/0056125 | A1* | 2/2014 | Guellal ............ H04L 45/68 370/225 |
| 2014/0233446 | A1* | 8/2014 | Fanfelle ............ H04W 4/06 370/312 |
| 2015/0195196 | A1 | 7/2015 | Patel |
| 2015/0263862 | A1 | 9/2015 | Sugyou et al. |
| 2016/0218972 | A1 | 7/2016 | Sun |
| 2017/0346678 | A1* | 11/2017 | Desdier ............ H04L 43/0805 |

FOREIGN PATENT DOCUMENTS

| | | |
|---|---|---|
| CN | 102594650 A | 7/2012 |
| CN | 102598602 A | 7/2012 |
| CN | 104838625 A | 8/2015 |
| CN | 104885428 A | 9/2015 |
| CN | 105900407 A | 8/2016 |
| CN | 106254203 A | 12/2016 |
| CN | 108023971 A | 5/2018 |
| EP | 0902569 A1 | 3/1999 |
| JP | 2004254288 A | 9/2004 |
| JP | 2008060631 A | 3/2008 |
| JP | 2008236230 A | 10/2008 |
| WO | 2008002294 A1 | 1/2008 |
| WO | 2014112863 A1 | 7/2014 |
| WO | 2016085375 A | 6/2017 |

OTHER PUBLICATIONS

IEEE, "IEEE Standard for Local and Metropolitan Area Networks: Media Access Control (MAC) Bridges", IEEE Computer Society, IEEE Std 802.1D™-2004 (Revision of IEEE Std 802.1D, 1998 Edition), Feb. 9, 2004, pp. 1-306.
"Bridging (Networking)", Transparent Bridging; Wikipedia; https://en.wikipedia.org/wiki/Bridging_(networking)#Transparent_bridging, Jun. 1, 2018, pp. 1-4.
"Mesh Profile", Bluetooth Specification, Revision V. 1.0., Mesh Working Group, Jul. 13, 2017, pp. 1-331.

* cited by examiner

METHOD OF AND DEVICES FOR SUPPORTING SELECTIVE FORWARDING OF MESSAGES IN A NETWORK OF COMMUNICATIVELY COUPLED COMMUNICATION DEVICES

TECHNICAL FIELD

The present disclosure generally relates to the field of data communication networks, and more specifically to selective forwarding of messages by a gateway device in a wireless mesh network.

BACKGROUND

Wireless Mesh Networks, WMNs, Wireless Personal Area Networks, WPANs, or in general communication networks comprised of a plurality of communicatively interconnected devices. Such a network generally comprises multiple network end nodes, network relay nodes, such as bridges, switches and other electric infrastructure devices and equipment, and at least one network control or coordinator device which may provide access to other networks and the Internet, for example. Such a network control or coordinator device is generically called a gateway device.

Network protocols for exchanging data by networked devices or nodes are generally available and known as Bluetooth™, Bluetooth Mesh as well as Wi-Fi based protocols for wireless networks. Examples of communication devices are Customer-Premises Equipment, CPE, having communication capabilities, Internet of Things, IoT, devices, and User Equipment, UE, for mobile telephone and data communication. In practice, the term network node device or in short node device or node is generic for all such devices having a unique network address or a unicast address in the network.

Bluetooth Mesh, for example, enables mesh networking for Bluetooth Low Energy, BLE, devices. Nodes that are part of a Bluetooth Mesh network can communicate with each other over the mesh, or with entities on the Internet via a gateway. Relaying of messages is used to facilitate communication between nodes in the mesh that are not within single-hop communication distance. Example of devices that may benefit from being part of such a mesh network includes lights and light switches, Heating, Ventilation, and Air Conditioning, HVAC, sensors and actuators, as well as ambient monitoring and presence sensors.

Bluetooth Mesh networking builds on link layer data broadcasting and networking based on managed message flooding. With managed flooding, the path from the source to the destination need not be known beforehand; instead, any relay node that receives a message helps to forward it to its neighbours. The flooding architecture is simple and robust, and flooding networks adapt well to topology changes.

Two features are used to prevent unlimited forwarding of messages, namely a message cache and a time-to-live, TTL, counter.

A relay node keeps a list of already forwarded messages in its message cache. Any received message that is already in the message cache will not be forwarded again.

The TTL counter is used to limit the number of hops that a message may take. When forwarding a message, the relay node decrements the TTL by one. A message for which the TTL limit has been reached one, is not forwarded further.

However, even with these forwarding constraints, messages are proliferated into large parts of the network, often for no good. Flooding mesh networks are hence wasteful of bandwidth and scales relatively poorly to larger deployments and higher throughputs.

The Bluetooth Mesh specifications define the Bearer, Network, Transport—lower and upper layers, Access layer, Foundation Model layer, and Model layer, and works on top of the Bluetooth Low Energy, BLE, core specification. The bearer layer defines how network messages, or network Protocol Data Units, PDUs, are transported between nodes, and there are two bearers defined in the Bluetooth Mesh Profile specification: the Advertising Bearer and the Generic Attributes, GATT, bearer. Additional bearers may be defined in the future and it is possible to utilize other link technologies as proprietary bearers. A node that supports both the Advertising Bearer and the GATT bearer is referred to as a proxy node, and may be used to include devices that do not yet support the Advertising Bearer, such as some smartphones, in a Bluetooth Mesh network.

Bluetooth Mesh implements a publish-and-subscribe message exchange model. Upon provisioning, every element in a Bluetooth Mesh network is assigned a mesh or a network address. It may also be understood that a single node device comprises several elements. When sending a unicast message to an element, the destination field in the network PDU header is set to the address of the element. By default, a node subscribes to, or listens to, messages sent to any of its element's addresses.

A node may further be configured to subscribe to one or several group addresses or virtual addresses defined in the network. Upon receiving a message sent to a group address or a virtual address to which the node subscribes, the node processes the message. Similarly, a node may be configured to publish messages to a specific group address or virtual address. To do this, a node simply sets the destination field in the network PDU to the corresponding group address or virtual address, and sends the message. In Bluetooth Mesh, the configuration of the publish-and-subscribe patterns are performed by the Configuration Client.

A Group Address, GA, is a multicast address which represents one or more elements. Group addresses are either defined by the Bluetooth Special Interest Group, SIG, and are known as SIG Fixed Group Addresses or they are assigned dynamically. Up to 256 SIG Fixed Group Addresses are allowed. A Virtual Address, VA, is an address which may be assigned to one or more elements, spanning one or more Nodes. It takes the form of a 128-bit Universally Unique Identifier, UUID, value with which any element can be associated, and is much like a label.

For monitoring purposes, Bluetooth Mesh includes a message referred to as a heartbeat message. Nodes can be configured to send such heartbeat messages at regular intervals to a specific group address. Nodes that have interest in receiving heartbeat messages subscribe to the same group address. When receiving a heartbeat message, the receiving node can conclude that the node sending the heartbeat message is still active in the network. Furthermore, based on the content of the heartbeat message and the number of times the heartbeat message is received, the receiving node can estimate the reliability of the network from the node sending the heartbeat message, the distance to the node sending the heartbeat message, as well as the active features of the node sending the heartbeat message.

In a particular network, such as a Bluetooth Mesh network, a gateway may interface the network over a non-Bluetooth technology. Such a Bluetooth Mesh gateway may be used, for example, to provide connectivity between the mesh network and a backend server, or between mesh network segments that are geographically separated. To exemplify the latter, nodes in different buildings in a larger campus or industrial area, may still benefit from being part of the same mesh network even though it is not possible to inter-connect the network segments via the mesh itself.

The gateways, in a Bluetooth network, may implement two or three network interfaces over which messages can be sent and received. One interface may, for example, connect to the standardized Advertising Bearer and provide connectivity to other Bluetooth Mesh nodes in the mesh network segment. Another interface may connect to the gateway bearer, which may utilize for example User Datagram Protocol/Internet Protocol, UDP/IP, or Transmission Control Protocol/Internet Protocol, TCP/IP, transport, and may be carried over a cellular, Wireless Fidelity, Wi-Fi, or Ethernet link.

By means of the gateway bearer, mesh network PDUs are tunneled from the gateway to the backend or between gateways. Accordingly, this solution maintains the mesh security intact end-to-end, at both network and application layer.

Note that it may also be possible to implement gateways using other architectural solutions. For example, when connecting to a backend server, the gateway could terminate the mesh protocol stack and send the data to the backend using some other protocol, such as the Lightweight Machine-to-Machine, LWM2M, protocol. These alternative solutions are not discussed further in this disclosure.

The Institute of Electrical and Electronics Engineers, IEEE, standard 802.1, and specifically 802.1D specifies bridging Local Area Network, LAN, segments. In its simplest form, a bridge receiving a frame re-sends it on all interfaces except for the one the frame is received from.

In a more advanced form, the bridge sends the frame only on the interface where the destination node is located. It does so by keeping a database of which node source addresses are heard on which interface. A received frame's destination address is looked up in this table, and the frame is sent on its corresponding interface. If the destination address is not present in the table, the frame is sent on all interfaces, except for the one the frame is received from. Entries in the table are aged and thrown away if no message is heard from the node's address within a certain time. If a frame from a node is heard on an interface other than the one in the table, the new interface is registered from that node. This technique is called transparent bridging.

These two methods, i.e. bridging and transparent bridging, work well if the network of interconnected nodes and network segments is a directed graph. If there are loops in the network, more elaborate algorithms are used such as the IEEE 802.1D Spanning Tree Protocol, STP.

There are tools available to manage message flooding in Bluetooth Mesh networks. But for a gateway that processes an incoming message published to a group or a virtual address, none of the available tools can be used to determine over which interfaces the message should be forwarded.

By default, messages in a flooding mesh network are proliferated into all parts of the network, often for no good since it is typically only a sub-set of the nodes that have interest in a specific message. The network message cache and the TTL counter are Bluetooth Mesh tools that can be used to limit the forwarding of messages, however, these tools cannot be used to determine if it is useful to forward a message over a given interface, as is the case in a gateway.

Furthermore, the techniques used to limit message forwarding in IEEE 802.1 bridges can be used to control the forwarding of unicast messages, but it is not possible to directly apply these solutions to messages that are published to a group address or a virtual address, following the publish-and-subscribe paradigm employed in Bluetooth Mesh.

SUMMARY

An object of the present disclosure is to reduce the number of messages being sent in a wireless mesh network, especially in network segments where the messages are proliferated for no purpose.

Another object of the present disclosure is to reduce the traffic over mesh gateway bearers and to limit the proliferation of messages published to group or virtual addresses to network segments in which there is at least one node subscribing to the message.

In a first aspect of the present disclosure, there is presented a method, by a gateway device, to support selective forwarding of messages published to one of a group address and a virtual address in a network of communicatively coupled communication devices each having a unique unicast address, the gateway device comprising a plurality of network interfaces arranged for receiving and transmitting messages in the network and for communicatively coupling to a configuration client, the configuration client being arranged for maintaining the unicast addresses of the communication devices in the network and a mapping between unicast addresses and at least one of a group address and a virtual address of communication devices in the network.

The method comprises the steps of receiving, by the gateway device, over a network interface, of a message published to a group address or a virtual address; retrieving, by the gateway device, based on the mapping by the configuration client, unicast addresses of all communication devices collectively identified by the group or the virtual address in the received message; determining, by the gateway device, based on the retrieved unicast addresses, that all the communication devices are serviced by the gateway device, and sending, by the gateway device, the received message on all interfaces corresponding to the communication devices addressed by the retrieved unicast addresses.

A Bluetooth Mesh gateway device can be used to interface a Bluetooth Mesh network over a non-Bluetooth technology. Such a Bluetooth gateway can, for example, be used to provide connectivity between the mesh network and a backend server, or between mesh network segments that are geographically separated. The method proposed according to the present disclosure, filters or reduces the traffic over the mesh gateway bearers and effectively limits the proliferation of messages published to group or virtual addresses to network segments, in which there is at least one node subscribing to the message.

When receiving a message published to a group address or a virtual address, gateways utilize the node location information and the subscription information to determine over which interfaces the message should be forwarded. Such selective forwarding of messages reduces the traffic in the mesh network and over network interfaces, without degrading application performance. A unicast address identifies a single, specific element of a node, and is unique in the network. The step of sending, may be achieved by unicasting the message over respective network interfaces.

According to an embodiment, the step of retrieving comprises accessing, by the gateway device, the configuration client, for retrieving unicast addresses of all communication devices collectively identified by the group address or the virtual address.

The configuration client has knowledge of the unicast address of all nodes, as well as the group addresses and virtual addresses that the individual nodes subscribe to. However the configuration client does not know in which network segment a node is located. By using transparent bridging, the gateway device keeps track of which nodes are heard on which interface, and therefore knows in which network segment a node is located. By combining the two sets of information, it is possible to limit the proliferation of messages to network segments where at least one node that subscribes to a message is located.

In an embodiment, the step of retrieving comprises retrieving unicast addresses of all communication devices collectively identified by the group or the virtual address from a database accessible by the gateway device and periodically configured by the configuration client.

The configuration client may further configure each gateway with information about the relation between a node's unicast addresses and the group addresses and virtual addresses that the node subscribes to. For example, two tables may be used for this purpose. The first table may contain the node's unicast address in the first column and the group and virtual addresses that the node subscribes to in the second column. The second table may contain a group address or a virtual address in the first column and in the second column it contains the unicast addresses of nodes that subscribe to the group or virtual address. The skilled person understands that it may be possible to derive the second table from the first, and vice versa.

It is noted that it is not mandatory for a node device to subscribe to a group adders or a virtual address. Hence, the network may comprise node devices that are not subscribed to a particular group or virtual address. However, a particular node device, with its unicast address, may be subscribed to plural different group or virtual addresses.

According to an exemplary embodiment, the gateway device periodically receives, over the network interfaces, heartbeat messages of communication devices, wherein said message is unicast over respective network interfaces from which said heartbeat messages are received. The heartbeat messages give an indication to the gateway device that a node, from which the heartbeat message originates, is still active in the network. The gateway device may use this information to delete older entries or information regarding nodes from which heartbeat messages have not been received for a predefined amount of time. The skilled person understands that such information may also be made available from regular messages being transmitted in the mesh network as well.

According to an embodiment of the first aspect of the present disclosure, the gateway device upon determining that at least one communication device is not serviced by the gateway device, performs the step of sending, by the gateway device, the received message on all network interfaces except for the interface over which the message was received.

If in the step of determining, it appears that not all unicast addresses belong to nodes in the same segment, the gateway device may forward the received message over all interfaces except for the one over which it was received. This ensures that network nodes in other segments to which the message is addresses will receive the message.

In an exemplary embodiment, the method comprises any one of the further steps of discarding, by the gateway device, the received message if the group address or virtual address in the received message is not known in the network, or transmitting, by the gateway device, the received message over all interfaces if the group address or virtual address in the received message is not known in the network.

It may be beneficial to include a preliminary check to examine whether the message belongs to the network. If the group address or the virtual address is not valid or is not recognized by the gateway device there is no need to process the message further. The gateway device, may then choose to either discard the message or broadcast the message over all interfaces.

In a second aspect of the present disclosure, there is presented a method, by a configuration client, to support selective forwarding of messages published to one of a group address and a virtual address in a network of communicatively coupled communication devices, each having a unique unicast address, serviced by a gateway device arranged for communicatively coupling to the configuration client, the configuration client being arranged for maintaining the unicast addresses of the communication devices in the network and a mapping between unicast addresses and at least one of a group address and a virtual address of communication devices in the network.

The method comprises the steps of receiving, by the configuration client, from the gateway device, a request message comprising a group address or a virtual address, the request message requesting unicast addresses of communication devices collectively addressed by the group address or virtual address, and forwarding, by the configuration client, to the gateway device, based on the mapping by the configuration client, unicast addresses of communication devices that are collectively addressed by the group address or virtual address in the received request message.

The configuration client may configure the publishing and subscribe addresses used by nodes in the network. Therefore, the configuration client may determine the addresses to which a node publishes as well as the addresses to which a node subscribes. In Bluetooth Mesh, group addresses and virtual addresses are typically used for this purpose.

In a third aspect of the present disclosure, there is presented a method, by a configuration client, to support selective forwarding of messages published to one of a group address and a virtual address in a network of communicatively coupled communication devices, each having a unique unicast address, serviced by a gateway device arranged for communicatively coupling to said configuration client, said configuration client being arranged for maintaining said unicast addresses of said communication devices in said network and a mapping between unicast addresses and at least one of a group address and a virtual address of communication devices in said network, said configuration client providing said gateway device with mapping information, mapping unicast addresses of communication devices to said group address or virtual address.

The method comprises the step of providing, by the configuration client, the gateway device with mapping information wherein the mapping information maps unicast addresses of communication devices to the group address or virtual address.

Each time the configuration client updates the subscription addresses of a node, all the gateways must be reconfigured to reflect the change. It may therefore be beneficial for the configuration client to provide the gateway device with the mapping information without receiving a request message.

In a fourth aspect of the present disclosure, there is presented a gateway device arranged for supporting selective forwarding of messages published to one of a group address and a virtual address in a network of communicatively coupled communication devices each having a unique unicast address, the gateway device comprising a plurality of network interfaces arranged for receiving and transmitting messages in the network and for communicatively coupling of the gateway device to a configuration client, the configuration client being arranged for maintaining the unicast addresses of communication devices and a mapping between unicast addresses of communication devices and at least one of a group address and a virtual address of the communication devices in the network.

The gateway device being controlled by a processor and comprises receive equipment, arranged for receiving, over a network interface, of a message published to a group address or a virtual address, retrieve equipment, arranged for retrieving, based on the mapping by the configuration client, unicast addresses of all communication devices collectively identified by the group or the virtual address in the received message, determine equipment, arranged for determining, based on the retrieved unicast addresses, that all the communication devices are serviced by the gateway device, and transmit equipment arranged for sending the received message on all interfaces corresponding to the communication devices addressed by the retrieved unicast addresses.

In an embodiment, the retrieve equipment is further arranged to access the configuration client for retrieving unicast addresses of all communication devices collectively identified by the group or the virtual address.

According to an embodiment, the retrieve equipment is further arranged to retrieve unicast addresses of all communication devices collectively identified by the group or the virtual address from a database accessible by the gateway device and periodically configured by the configuration client.

In an exemplary embodiment, the transmit equipment is further arranged to send, by the gateway device, the received message on all network interfaces except for the interface over which the message was received upon determining that at least one communication device is not serviced by the gateway device.

According to an embodiment, the gateway device, further comprises discard equipment arranged for discarding the received message if the group address or virtual address in the received message is not known in the network.

In a fifth aspect of the present disclosure, there is presented a configuration client arranged for supporting selective forwarding of messages published to one of a group address and a virtual address in a network of communicatively coupled communication devices, each having a unique unicast address, serviced by a gateway device, the configuration client being arranged for communicatively coupling to the gateway device and for maintaining the unicast addresses of the communication devices in the network and a mapping between unicast addresses and at least one of a group address and a virtual address of communication devices in the network.

The configuration client is controlled by a processor and comprises a database, arranged for maintaining unicast addresses of the communication devices in the network and a mapping between unicast addresses and at least one of a group address and a virtual address of communication devices in the network, receive equipment, arranged for receiving, from the gateway device, a request message comprising a group address or a virtual address, the request message requesting unicast addresses of communication devices collectively addressed by the group address or virtual address, and forward equipment, arranged for forwarding, by transmitter equipment to the gateway device, based on the mapping, unicast addresses of communication devices collectively addressed by the group address or virtual address in the received message.

According to an embodiment, the configuration client further comprises configure equipment, arranged for configuring gateway devices in the network with the mapping between unicast addresses of communication devices and at least one of a group address and a virtual address of communication devices in the network.

According to a sixth aspect of the present disclosure, there is provided a computer program product, comprising a computer readable storage medium, either a non-transitory medium or a downloadable data signal storing instructions which when executed on at least one processor cause the at least one processor to carry out the method according to any of the first and the second aspects of the present disclosure.

DETAILED DESCRIPTION

Some of the embodiments contemplated herein will now be described more fully with reference to the accompanying drawings illustrating a Bluetooth Mesh system implementation. Other networks or systems and embodiments, operating with other communication protocols, however, are contained within the scope of the subject matter disclosed herein. The disclosed subject matter should not be construed as limited to only the embodiments set forth herein. Rather, these embodiments are provided by way of example to convey the scope of the subject matter to those skilled in the art.

Figure 1:
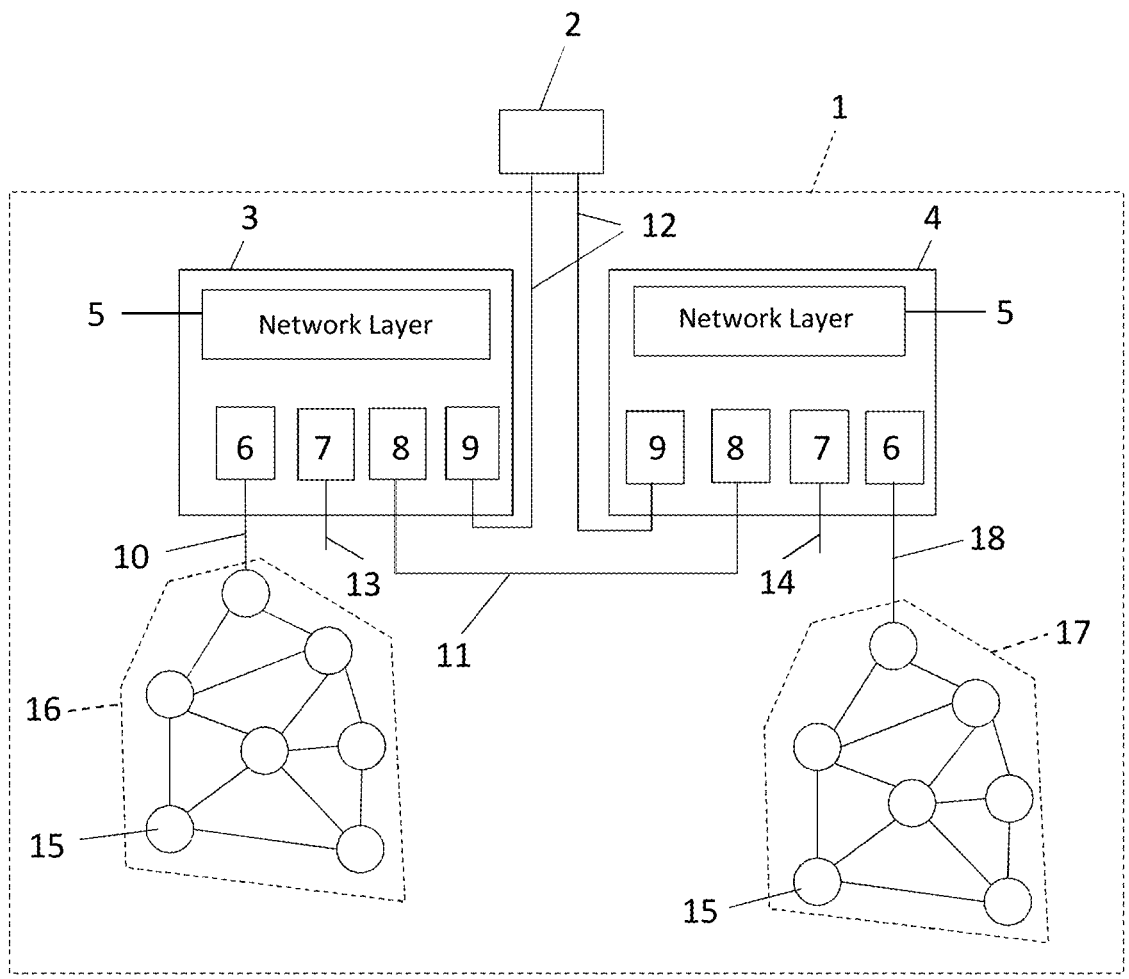
FIG. 1 schematically illustrates an exemplary system comprising two mesh network segments and two gateways.

FIG. 1 schematically illustrates an exemplary Bluetooth Mesh system 1 comprising two Bluetooth Mesh network segments 16, 17 and two Bluetooth Mesh gateways 3, 4. The figure depicts how two Advertising Bearer Segments 10, 18 and two Gateway Bearer Segments 11, 12 are connected between the two gateways 3, 4 and a configuration client 2. The gateways 3, 4 in the picture implement network interfaces 6, 7, 8, 9 over which messages and/or network Protocol Data Units, PDUs, can be sent and received.

One interface 6 connects to the standardized Advertising Bearer 10, 18 and provides connectivity to Bluetooth Mesh nodes 15 in the Bluetooth Mesh network segment 16, 17.

Another interface 8 connects to the Gateway Bearer Segment 11, and interface 9 connects by the Gateway Bearer Segment 12 to the configuration client 2. Both interfaces 8, 9 may utilize, for example, User Datagram Protocol, UDP/ Internet Protocol, IP, or Transmission Control Protocol, TCP/IP transport, and may be carried over a cellular Third Generation Partnership Project, 3GPP, Wireless-Fidelity, Wi-Fi, or Ethernet link, or the like.

The Network layer 5 in a gateway 3, 4, among others, handles message forwarding and supports sending and receiving messages via multiple bearers. Each instance of a bearer is connected to the Network layer 5 via a network interface 6-9. A message received on the Network layer 5 over one interface will be forwarded over the other interface(s). The Network layer 5 also implements a dual-layer security scheme, for encrypting and authenticating messages in the Bluetooth Mesh network.

Since the Bluetooth Mesh networking standard is still under development, the gateway device 3, 4 may also comprises additional interfaces 7 to connect to other nodes over bearers 13, 14 to be specified in the future.

Figure 2:
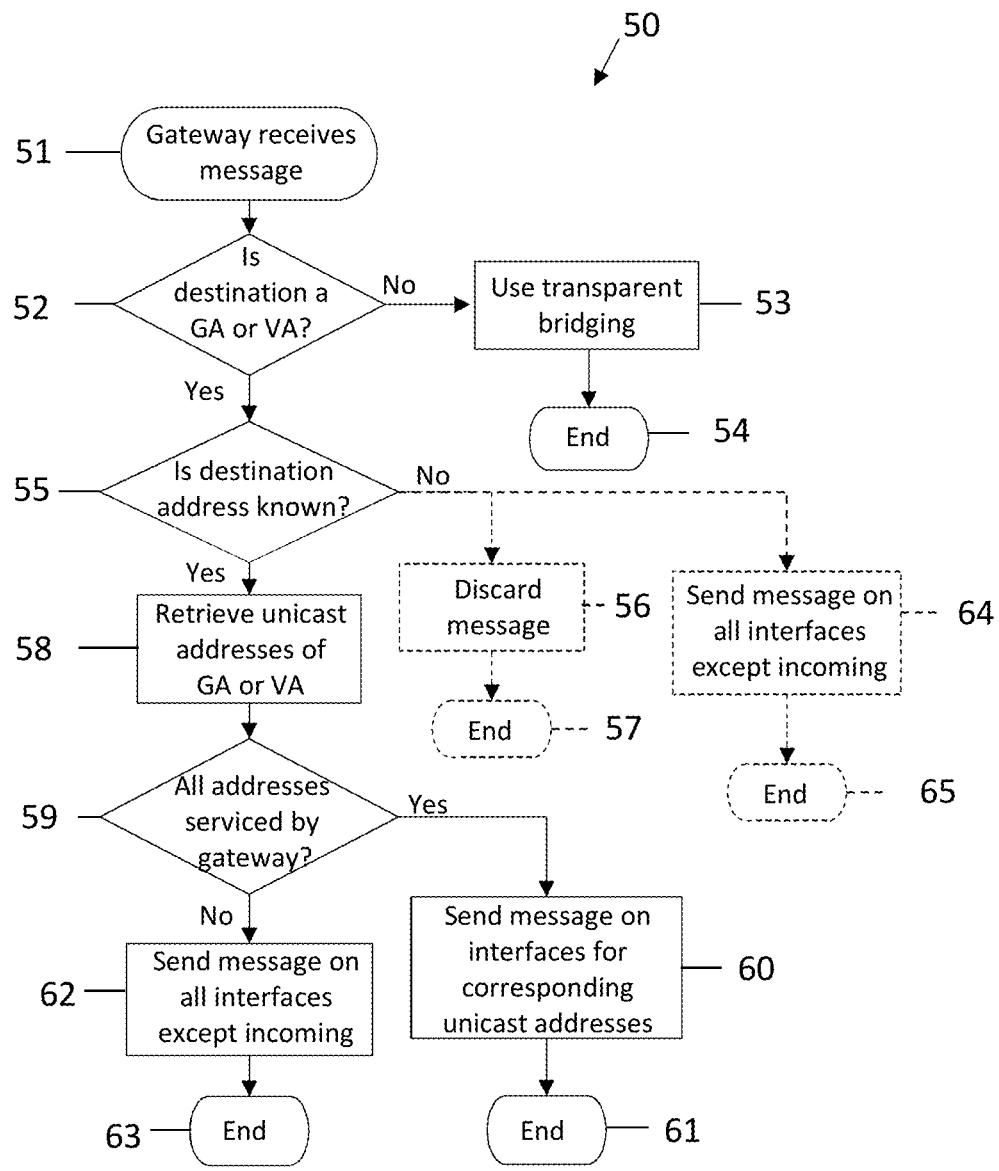
FIG. 2 schematically illustrates an exemplary method according to the present disclosure.

FIG. 2 schematically illustrates a method 50 according to the present disclosure. In a first step 51, the gateway device 3, 4; 100 receives a message. For the sake of simplicity, the method is further elaborated with the assumption that gateway device 3, associated with mesh network segment 16, receives the message. The skilled person understands that the method is equally applicable when gateway device 4 or any other gateway device in the mesh network receives such a message. In step 52, the gateway device 3 determines whether the destination address is a Group Address, GA, or a Virtual Address, VA.

A group address is a multicast address which represents one or more elements. Group addresses are either defined by the Bluetooth Special Interests Group, SIG, and are known as SIG fixed group addresses or they are assigned dynamically. Up to 256 SIG fixed group addresses are allowed, of which at the time of writing, only four have been defined. These are named All-proxies, All-friends, All-relays and All-nodes. A virtual address is an address which may be assigned to one or more elements, spanning one or more nodes. It takes the form of a 128-bit Universally Unique Identifier, UUID, value with which any element can be associated, and is much like a label.

If it is determined that the destination address is not a group address or a virtual address, step 52 result 'No', the message may be processed as usual or may be forwarded in the network using transparent bridging 53, 54. This is not the scope of the present disclosure. The scope of the present disclosure concerns the situation when the gateway device 3 determines that the destination address of the received message is a group address or a virtual address, i.e. step 52 result 'Yes'.

Subsequently, in step 55, the gateway device 3 checks whether the destination address is known to the gateway device. An unknown destination address can be due to, for example, an invalid address format or wrong network identification, ID. If the destination address is not known, i.e. step 55 result 'No', the message either may be discarded 56, 57 or may be forwarded 64, 65 over all interfaces other than the one over which it was received. If the destination address is known to the gateway device 3, i.e. step 55 result 'Yes', the method 50 proceeds further with step 58.

In this step 58, the gateway device 3 retrieves the unicast addresses of all nodes subscribing to the group address or virtual address comprised by the message received by the gateway device 3. It is noted that a unicast address identifies a single, specific element of a node. A Provisioner (not shown) manages the allocation of unicast addresses and ensures that no duplicates are allocated within a network. It is noted that not all unicast addresses need to be subscribed to a group or virtual address. Further, a particular unicast address may be subscribed to plural different group or virtual addresses.

According to a solution proposed by the present disclosure, the gateway device 3 may send a query message to the configuration client 2; 150 with the received group address or virtual address, requesting the relevant unicast address information. Alternately, it may also be the situation that the configuration client 2; 150 has already provided the gateway device 3 with mapping information for retrieving the respective unicast addresses. Such a provision by the configuration client 2; 150 may occur periodically. In such a case, the mapping information may be stored at the gateway device in a table or in a database, for example. The unicast addresses may then be retrieved by the gateway device from this table or database.

In step 59, the gateway device 3 checks whether all the retrieved unicast addresses relate to nodes serviced by the gateway device 3. In other words, the gateway device 3 checks whether all the nodes subscribing to the respective group address or virtual address are part of network segment 16. Upon successful determination, i.e. step 59 result 'Yes', the message is sent 60, 61 by the gateway device 3 to all the nodes 15 over the respective interfaces over which they may be contacted.

If, however, it is determined that some nodes belong to another network segment 17, for example, i.e. step 59 result 'No', the gateway device sends the received message over all interfaces other than the one over which it was received, step 62, 63.

Figure 3:
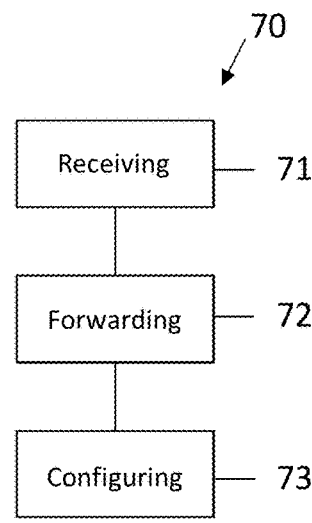
FIG. 3 schematically illustrates, in a flow chart type diagram, an exemplary method according to the present disclosure.

FIG. 3 schematically illustrates a method 70 according to the present disclosure. The method 70 illustrates a method to support selective forwarding of messages published to a group address or a virtual address in a Bluetooth Mesh network. In a first step 71, the configuration client 2; 150 receives a request or query message from a gateway device 3, 4; 100 requesting unicast addresses of communication devices collectively addressed by a group address or a virtual address in a message received by the gateway device. The request or query message comprises the group address or the virtual address received by the gateway device 3, 4; 100, or any other information referring to this group address or virtual address.

The person skilled in the art will appreciate that the configuration client 2; 150 is aware of the requested information, as each communication device or node, at the time of registering itself in a mesh network, registers with the configuration client 2; 150 and is assigned a unique address in the network by the configuration client, for example.

Furthermore, when a group of communication devices is identified, a unique group address is also assigned by or registered with the configuration client 2; 150. To this extent, the configuration client 2; 150 may maintain a database or table. Such a table may, in a first column, contain the unicast address of each node and in a second or further columns contain the group address of the groups to which a particular communication device belongs.

In a second step 72, the configuration client 2; 150 forwards, to the requesting gateway device 3, 4; 100, those unicast addresses of nodes that are collectively addressed by the group address or virtual address in the query or request message.

Alternately, a first column may contain a group address and the second and further columns may list the unicast addresses of the communication device belonging to the corresponding group.

In addition to or as an alternative option for steps 71, 72, the configuration client 2; 150 may provide or configure 73 the gateway device 3, 4; 100 with mapping information, mapping unicast addresses of communication devices to group addresses or virtual addresses available to the configuration client 2; 150. This mapping information may be periodically provided by the configuration client 2; 150 and stored at the gateway devices 3, 4; 100. In the latter option, for retrieving unicast addresses, step 71 may be replaced by accessing the mapping information locally stored.

Figure 4:
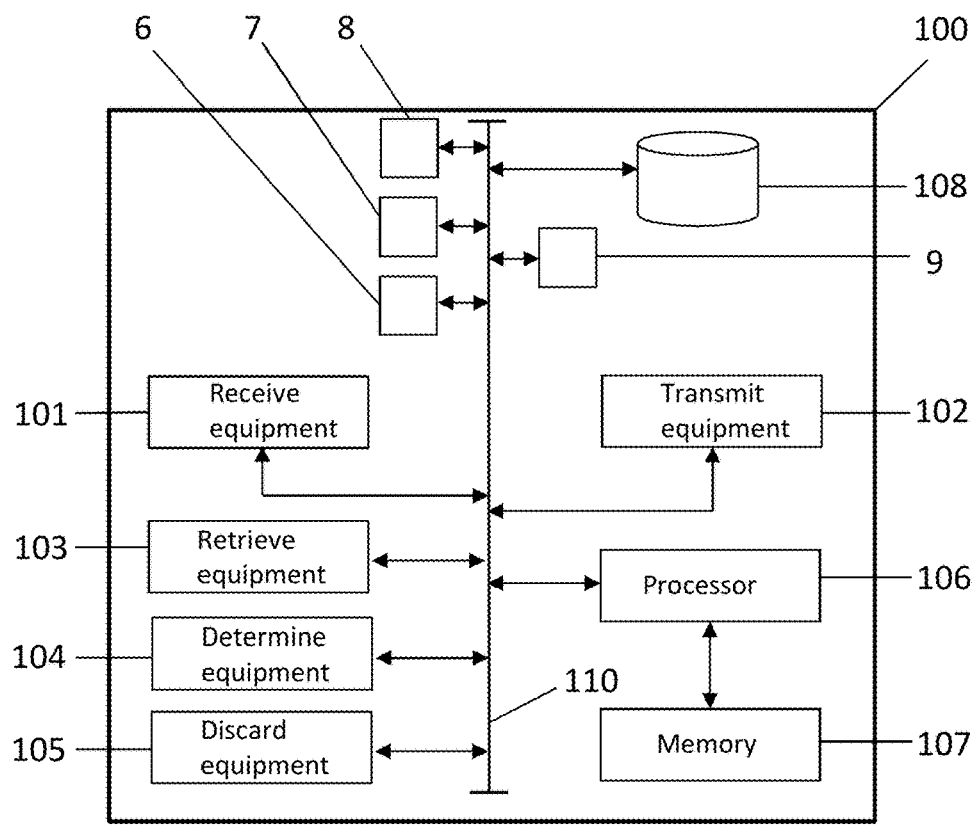
FIG. 4 schematically illustrates an exemplary gateway device according to the present disclosure.

FIG. 4 schematically illustrates a gateway device 100 according to the present disclosure. The gateway device 100 comprises network interfaces 6, 7, 8, 9 which are used by the gateway device 100 to communicate with other entities in the mesh network. The receive equipment 101 is arranged to receive messages or network PDUs. The processor 106, among others, may perform or support steps such as determining that the destination address of a received message is a group address or a virtual address, whether the destination address is known with the gateway device, and transparent bridging, i.e. steps 52, 55, 53, respectively, in FIG. 2.

The retrieve equipment 103 is arranged to retrieve the unicast addresses of all network elements or nodes that subscribe to the group address or virtual address in the received message, i.e. step 58 in FIG. 2. The retrieve equipment 103 may communicate with the configuration client 2; 150 to obtain such information. To this end the retrieve equipment 103 may comprise respective transceiver equipment. Alternately, the configuration client 2; 150 may periodically provide such information to the gateway device 100 through the retrieve equipment 103, for example, which information, in turn, may be stored internally in a table or a database 108. In that case, the retrieve equipment 103 obtains the relevant unicast addresses directly from the database 108.

The determine equipment 104 is arranged for determining whether all the retrieved unicast addresses belong to nodes that are service by the gateway device 100, i.e. step 59 in FIG. 2. If it is determined that all the retrieved unicast addresses are of nodes 15 serviced by the gateway device, the received message is transmitted to the relevant node devices 15 over corresponding network interfaces 6-9 with the help of the transmit equipment 102, i.e. step 60 in FIG. 2. If at least one node device is not serviced by the gateway device 100, the transmit equipment 102 forwards the received message over all interfaces 6-9 except for the one over which it was received, i.e. step 62 in FIG. 2.

Discard equipment 105 is provided, which is arranged to either discarded a received message or to forward the message over all interfaces other than the one over which it was received using the transmit equipment 102 when a destination address in a received message is not known to the gateway device, i.e. steps 56 and 64 in FIG. 2.

The gateway device further comprises a memory or other computer readable storage medium 107 arranged to store a set of processor executable instructions which when executed by the processor 106 cause the gateway device 100 to perform a method according to the present disclosure.

The internal components of the gateway device 100 communicate with one another using the internal bus 110.

Figure 5:
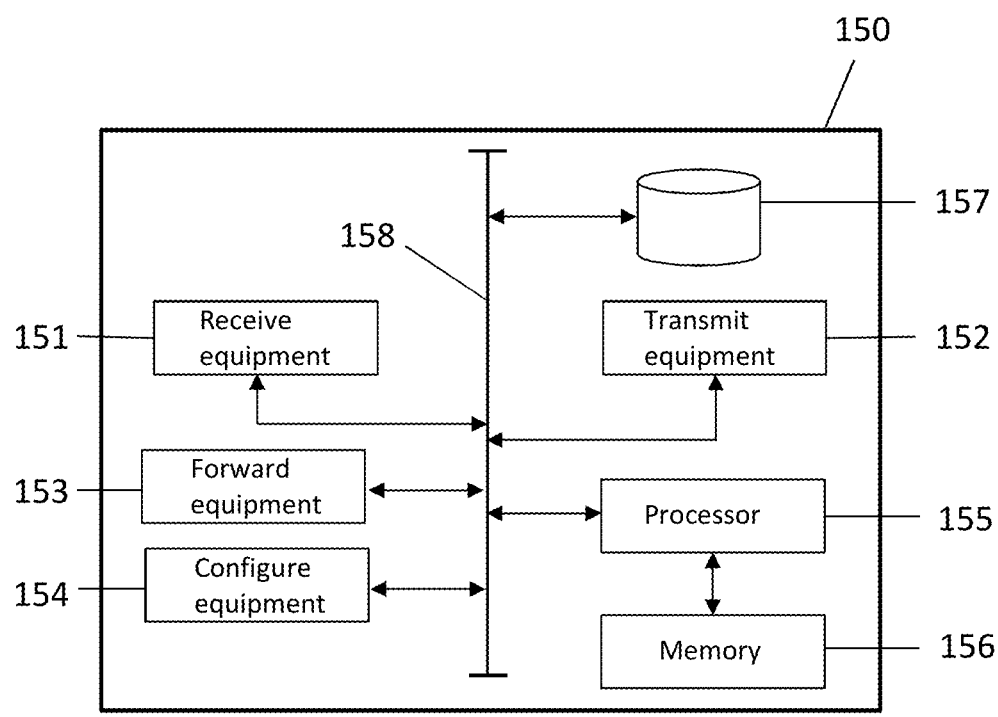
FIG. 5 schematically illustrates an exemplary configuration client according to the present disclosure.

FIG. 5 schematically illustrates a configuration client 150 according to the present disclosure. The configuration client 150 comprises receive equipment 151 arranged to receive a query or request message from the gateway device 3, 4, 100. i.e. step 70 in FIG. 3. The query message comprises a group address or a virtual address and the query message requests the unicast addresses of all the nodes that subscribe to that group or virtual address. A mapping of the group addresses to the unicast addresses of nodes are maintained by the configuration client 150 in the form of a table or database 157.

The processor 155 may obtain the required information from the database 157. The forward equipment 153 then forwards the mapping of the unicast addresses to the gateway device 100 via the transmit equipment 152, i.e. step 72 in FIG. 3. Additionally, the configuration client 150 may also comprise configure equipment 154 which is arranged to periodically configure the gateway devices in the network with information mapping unicast addresses of node devices to group or virtual addresses to which they subscribe, i.e. step 73 in FIG. 3.

The configuration client also comprises a memory or other computer readable storage medium 156 which is arranged to store a set of computer readable instructions which when executed by the processor 155 cause the configuration client 150 to perform a method according to the present disclosure.

The internal components of the configuration client 150 communicate with one another using the internal bus 158.

Other variations to the disclosed examples can be understood and effected by those skilled in the art of practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, can be modified and enhanced by those skilled in the art beyond the scope of the present disclosure as disclosed in the appended claims without having to apply inventive skills.

The invention claimed is:

1. A method for a gateway device to selectively forward messages in a wireless mesh network, the method comprising:
   receiving, from a configuration client, a mapping between the following respective unique unicast addresses assigned by the configuration client to respective communication devices, and one or more group addresses or virtual addresses, in the wireless mesh network, that are subscribed to by the respective communication devices;
   receiving, over one of a plurality of network interfaces of the gateway device, a message published to a group address or a virtual address;
   based on the mapping, retrieving, from a database accessible by the gateway device, the respective unique unicast addresses of all communication devices identified by the group address or the virtual address;
   based on determining that all communication devices addressed by the retrieved unicast addresses are serviced by the gateway device, sending the received message on all network interfaces, of the gateway device, that correspond to the communication devices addressed by the retrieved unicast addresses; and based on determining that not all communication devices addressed by the retrieved unicast addresses are serviced by the gateway device, sending the received message on all network interfaces of the gateway device except for the network interface over which the message was received.

2. The method of claim 1, further comprising storing the mapping in the database, wherein retrieving the unicast addresses from the database is based on the stored mapping and the group address or the virtual address to which the message is published.

3. The method of claim 1, further comprising performing one of the following operations based on determining that the group address or the virtual address in the received message is not known in the wireless mesh network:
discarding the received message; and
transmitting the received message over all network interfaces of the gateway device.

4. The method of claim 1, further comprising receiving periodic heartbeat messages over at least a portion of the network interfaces, wherein the received message is not sent on network interfaces over which periodic heartbeat messages are not received.

5. The method of claim 1, wherein the mapping is one of the following:
a first mapping between a plurality of unicast addresses and one or more group address or virtual address associated with each of the unicast addresses; or
a second mapping between a plurality of group or virtual addresses and one or more unicast addresses associated with each group or virtual address.

6. A non-transitory, computer-readable medium storing computer-executable instructions that when executed by a processor associated with a gateway device configured for selective forwarding of messages in a wireless mesh network, configure the gateway device to perform operations corresponding to the method of claim 1.

7. A method for a configuration client to support selective forwarding of messages in a wireless mesh network, the method comprising:
assigning respective unique unicast addresses to respective communication devices in response to receiving respective registration requests from the communication devices;
assigning a mapping between the following:
the assigned unicast addresses, and
one or more group addresses or virtual addresses, in the wireless mesh network, that are subscribed to by the respective communication devices; and
providing the mapping to a gateway device, wherein the provided mapping supports selective forwarding by the gateway device of each message published to a group address or a virtual address, according to the following:
to all network interfaces of the gateway device, when all communication devices addressed by unicast addresses mapped to the group address or the virtual address are serviced by the gateway device; and
to all except one of the network interfaces of the gateway device, when not all communication devices addressed by unicast addresses mapped to the group address or the virtual address are serviced by the gateway device.

8. The method of claim 7, further comprising periodically providing an updated mapping to the gateway device, according to changes in one or more of the following: the assigned unicast addresses, and the subscribed group addresses or virtual addresses.

9. The method of claim 7, wherein the mapping is of one of the following:
a first mapping between a plurality of unicast addresses and one or more group address or virtual address associated with each of the unicast addresses; or
a second mapping between a plurality of group or virtual addresses and one or more unicast addresses associated with each group or virtual address.

10. A non-transitory, computer-readable medium storing computer-executable instructions that when executed by a processor associated with a configuration client arranged to support selective forwarding of messages in a wireless mesh network, configure the configuration client to perform operations corresponding to the method of claim 7.

11. A gateway device configured for selective forwarding of messages in a wireless mesh network, the gateway device comprising:
a plurality of network interfaces; a processor operatively coupled to the network interfaces; and
a non-transitory, computer-readable storage medium storing computer-executable instructions that, when executed by the processor, configure the gateway device to:
receive, from a configuration client, a mapping between the following respective unique unicast addresses assigned by the configuration client to respective communication devices, and one or more group addresses or virtual addresses, in the wireless mesh network, that are subscribed to by the respective communication devices;
receive, over one of the network interfaces of the gateway device, a message published to a group address or a virtual address;
based on the mapping, retrieve, from a database accessible by the gateway device, the respective unique unicast addresses of all communication devices identified by the group address or the virtual address;
based on determining that all communication devices addressed by the retrieved unicast addresses are serviced by the gateway device, send the received message on all network interfaces, of the gateway device, that correspond to the communication devices addressed by the retrieved unicast addresses; and
based on determining that not all communication devices addressed by the retrieved unicast addresses are serviced by the gateway device, send the received message on all network interfaces of the gateway device except for the network interface over which the message was received.

12. The gateway device of claim 11, wherein the computer-executable instructions, when executed by the processor, further configure the gateway device to store the mapping in the database, wherein retrieving the unicast addresses from the database is based on the stored mapping and the group address or the virtual address to which the message is published.

13. The gateway device of claim 11, wherein the computer-executable instructions, when executed by the processor, further configure the gateway device to perform one of the following operations based on determining that the group address or the virtual address in the received message is not known in the wireless mesh network:

discarding the received message; and transmitting the received message over all network interfaces of the gateway device.

14. The gateway device of claim 11, wherein the computer-executable instructions, when executed by the processor, further configure the gateway device to receive periodic heartbeat messages over at least a portion of the network interfaces, wherein the received message is not sent on network interfaces over which periodic heartbeat messages are not received.

15. The gateway device of claim 11, wherein the mapping is one of the following:
- a first mapping between a plurality of unicast addresses and one or more group address or virtual address associated with each of the unicast addresses; or
- a second mapping between a plurality of group or virtual addresses and one or more unicast addresses associated with each group or virtual address.

16. A configuration client arranged to support selective forwarding of messages in a wireless mesh network, the configuration client comprising:
- a network interface arranged for communication with a gateway device associated with the wireless mesh network;
- a processor operatively coupled to the network interface; and
- a non-transitory, computer-readable storage medium storing computer-executable instructions that, when executed by the processor, configure the configuration client to:
  - assign respective unique unicast addresses to respective communication devices in response to receiving respective registration requests from the communication devices;
  - assign a mapping between the following:
    - the assigned unicast addresses, and
    - one or more group addresses or virtual addresses, in the wireless mesh network, that are subscribed to by the respective communication devices; and
  - provide the mapping to the gateway device, wherein the provided mapping supports selective forwarding by the gateway device of each message published to a group address or a virtual address, according to the following:
    - to all network interfaces of the gateway device, when all communication devices addressed by unicast addresses mapped to the group address or the virtual address are serviced by the gateway device; and
    - to all except one of the network interfaces of the gateway device, when not all communication devices addressed by unicast addresses mapped to the group address or the virtual address are serviced by the gateway device.

17. The configuration client of claim 16, wherein the computer-executable instructions, when executed by the processor, further configure the configuration client to periodically provide an updated mapping to the gateway device, according to changes in one or more of the following: the assigned unicast addresses, and the subscribed group addresses or virtual addresses.

18. The configuration client of claim 16, wherein the mapping is of one of the following:
- a first mapping between a plurality of unicast addresses and one or more group address or virtual address associated with each of the unicast addresses; or
- a second mapping between a plurality of group or virtual addresses and one or more unicast addresses associated with each group or virtual address.

* * * * *

UNITED STATES PATENT AND TRADEMARK OFFICE
CERTIFICATE OF CORRECTION

PATENT NO. : 11,750,411 B2
APPLICATION NO. : 18/079268
DATED : September 5, 2023
INVENTOR(S) : Skillermark et al.

It is certified that error appears in the above-identified patent and that said Letters Patent is hereby corrected as shown below:

In the Specification

In Column 1, Line 66, delete "reached one," and insert -- reached, --, therefor.

In Column 5, Line 34, delete "adders" and insert -- address --, therefor.

In Column 5, Line 65, delete "addresses" and insert -- addressed --, therefor.

In Column 8, Lines 65-67, "User Datagram Protocol, UDP/Internet Protocol, IP, or Transmission Control Protocol, TCP/IP" and insert -- User Datagram Protocol/Internet Protocol, UDP/IP, or Transmission Control Protocol/Internet Protocol, TCP/IP, --, therefor.

In Column 9, Lines 18-19, delete "device 3, 4; 100" and insert -- devices 3, 4, 100 --, therefor.

In Column 9, Line 30, delete "Interests" and insert -- Interest --, therefor.

In Column 10, Line 31, delete "step 62, 63." and insert -- steps 62, 63. --, therefor.

In Column 10, Lines 37-38, delete "device 3, 4; 100" and insert -- devices 3, 4, 100 --, therefor.

In Column 10, Lines 42-43, delete "device 3, 4; 100," and insert -- devices 3, 4, 100, --, therefor.

In Column 10, Line 60, delete "device 3, 4; 100," and insert -- devices 3, 4, 100, --, therefor.

In Column 11, Line 3, delete "device 3, 4; 100" and insert -- devices 3, 4, 100 --, therefor.

In Column 11, Line 8, delete "devices 3, 4; 100." and insert -- devices 3, 4, 100. --, therefor.

In Column 11, Line 38, delete "service" and insert -- serviced --, therefor.

Signed and Sealed this
Ninth Day of July, 2024

Katherine Kelly Vidal
*Director of the United States Patent and Trademark Office*

In Column 11, Line 49, delete "discarded" and insert -- discard --, therefor.

In Column 11, Line 64, delete "device 3, 4, 100." and insert -- devices 3, 4, 100, --, therefor.